(12) United States Patent
Jones et al.

(10) Patent No.: US 9,058,698 B2
(45) Date of Patent: *Jun. 16, 2015

(54) CREATING A CUSTOMIZED AVATAR THAT REFLECTS A USER'S DISTINGUISHABLE ATTRIBUTES

(75) Inventors: Scott T. Jones, Austin, TX (US); Michael A. Paolini, Austin, TX (US)

(73) Assignee: KING.COM LTD., St. Julians, MT (US)

( * ) Notice: Subject to any disclaimer, the term of this patent is extended or adjusted under 35 U.S.C. 154(b) by 574 days.

This patent is subject to a terminal disclaimer.

(21) Appl. No.: 13/346,376

(22) Filed: Jan. 9, 2012

(65) Prior Publication Data

US 2012/0106796 A1    May 3, 2012

Related U.S. Application Data

(63) Continuation of application No. 11/834,782, filed on Aug. 7, 2007, now Pat. No. 8,146,005.

(51) Int. Cl.
*G09G 5/00* (2006.01)
*G06K 9/00* (2006.01)
(Continued)

(52) U.S. Cl.
CPC . *G06T 13/40* (2013.01); *G06K 9/00* (2013.01); *G06F 3/00* (2013.01); *G06F 3/04815* (2013.01); *G01L 13/00* (2013.01); *G06F 3/048* (2013.01); *G09G 5/00* (2013.01); *G06T 17/00* (2013.01); *G10L 13/00* (2013.01); *A63F 2300/1012* (2013.01); *A63F 2300/1081* (2013.01); *A63F 2300/1087* (2013.01); *A63F 2300/401* (2013.01);
(Continued)

(58) Field of Classification Search
CPC ... A16B 5/1114; A16B 5/744; G06F 3/04815

USPC .......... 704/258; 715/707, 757, 760, 702; 600/437
See application file for complete search history.

(56) References Cited

U.S. PATENT DOCUMENTS 6,545,682 B1    4/2003  Ventrella et al.
6,772,195 B1 *  8/2004  Hatlelid et al. ............... 709/204
(Continued)

FOREIGN PATENT DOCUMENTS

KR            511210 B         8/2005

OTHER PUBLICATIONS

Buades, J.M, et al., "Human Body Segmentation and Matching Using Biomechanics 3D Models", Proceedings of the 8th International Conference on Information Visualization, pp. 79-84, Jul. 2004.
(Continued)

*Primary Examiner* — Boris Pesin
*Assistant Examiner* — Elizabeth G Wright
(74) *Attorney, Agent, or Firm* — Saul Ewing LLP

(57)    ABSTRACT

A capture system captures detectable attributes of a user. A differential system compares the detectable attributes with a normalized model of attributes, wherein the normalized model of attributes characterize normal representative attribute values across a sample of a plurality of users and generates differential attributes representing the differences between the detectable attributes and the normalized model of attributes. Multiple separate avatar creator systems receive the differential attributes and each apply the differential attributes to different base avatars to create custom avatars which reflect a selection of the detectable attributes of the user which are distinguishable from the normalized model of attributes.

15 Claims, 6 Drawing Sheets

(51) Int. Cl.
  G06T 17/00 (2006.01)
  G06T 13/40 (2011.01)
  G06F 3/00 (2006.01)
  G06F 3/048 (2013.01)
  G10L 13/00 (2006.01)
  G06F 3/0481 (2013.01)
  G01L 13/00 (2006.01)

(52) U.S. Cl.
  CPC ..... *A63F 2300/6018* (2013.01); *A63F 2300/65* (2013.01); *A63F 2300/6607* (2013.01); *G06T 2200/08* (2013.01); *G06T 2200/24* (2013.01)

(56) References Cited

U.S. PATENT DOCUMENTS

| | | | |
|---|---|---|---|
| 6,817,979 | B2 | 11/2004 | Nihtila |
| 6,948,131 | B1 * | 9/2005 | Neven et al. ............. 715/753 |
| 7,184,047 | B1 * | 2/2007 | Crampton ................. 345/473 |
| 7,396,281 | B2 * | 7/2008 | Mendelsohn et al. ........ 463/42 |
| 7,478,047 | B2 * | 1/2009 | Loyall et al. ............. 704/258 |
| 2002/0067362 | A1 | 6/2002 | Agostino Nocera et al. |
| 2006/0089543 | A1 | 4/2006 | Kim et al. |
| 2006/0178965 | A1 * | 8/2006 | Jung et al. ................ 705/35 |
| 2007/0050715 | A1 | 3/2007 | Behar |
| 2009/0044113 | A1 | 2/2009 | Jones et al. |

OTHER PUBLICATIONS

Yonggao, Y., et al, "Rendering Avatar in Virtual Reality: Integrating a 3D Model With 2D Images", Computing in Science & Engineering, vol. 4, Issue 1, pp. 86-91, Jan.-Feb. 2002.

Yanning, X, et al, "Research on Intelligent Avatar in VRML Worlds", Journal of System Simulation, 8th International Conference on Computer Supported Cooperative Work in Design Proceedings, vol. 16, No. 11, pp. 2381-2387, Nov. 2004.

Oliveira, J., et al, "Animating Scanned Human Models", Proceedings of WSCG, Feb. 2003, 8 Pages.

Hilton, A, et al. "Virtual People: Capturing Human Models to Populate Virtual Worlds", Computer Animation, Center for Vision, Speech, and Signal Processing, pp. 174-185, 1999.

Capin, TK, et al, "Virtual Human Representation and Communication in VLNET Networked Virtual Environment", IEEE Computer Graphics and Applications, pp. 42-53, 1997, 16 Pages.

Thalmann, Daniel, "The Role of Virtual Humans in Virtual Environment Technology and Interfaces", Computer Graphics Lab, Switzerland, pp. 1-12, Not Dated, Accessed Online From <http://vrlab.epfl.ch/Publications/pdf/Thalmann_EC_NSF_99.pdf> as of Jul. 17, 2007.

Champ, P, et al, "Avatars and the Populate Project", I3NET, Copyright 1998, 1999, 2000, 4 Pages, [Online], [Accesed on Jul. 17, 2007]. Available From the Internet at <http://www.i3net.org/ser_pub/services/magazine/november97/populate.html>.

Technology Transfer, Aerospace Technology Innovation, vol. 7, No. 5, Sep./Oct. 1999, 4 Pages, [Online], [Accessed on Jul. 17, 2007]. Available From the Internet at <http://ipp.nasa.gov/innovation/Innovation_75/rmot.htm>.

"Medicine Chapter 3: Ultrasound", It's About Time, Herff Jones Educational Division, Copyright 2007, 2 Pages, [Online], [Accessed on Jul. 17, 2007]. Available From the Internet at <http://www.its-about-time.com/htmls/ap/apmed3.html>.

Kshirsagar, S, et al, "Avatar Markup Language", 2002 Eurographics Workshop Proceedings on Virtual Environments, pp. 168-177, May 2002.

* cited by examiner

CREATING A CUSTOMIZED AVATAR THAT REFLECTS A USER'S DISTINGUISHABLE ATTRIBUTES

CROSS-REFERENCE TO RELATED APPLICATIONS

This application is a continuation of commonly assigned U.S. patent application Ser. No. 11/834,782, filed Aug. 7, 2007, which is hereby incorporated herein by reference.

BACKGROUND OF THE INVENTION

1. Technical Field

The present invention relates to the field of graphical user interfaces for computer displays, and more particularly to graphical interfaces for creating a customized avatar that reflects a user's distinguishable attributes.

2. Description of the Related Art

Computer software applications and online websites may require or allow users to interact within the application or website environment through a graphical representation of the user. The animation of a graphical representation is used to illustrate the interaction of the user within the environment. In one example, this animated graphical representation is called an avatar.

While an avatar is a representation of a user within a computing environment, systems for creating an avatar which reflects the actual features of a user are limited. Therefore, there is a need for a method, system, and program for creating a customized avatar that more accurately reflects actual, distinguishing features of a user.

SUMMARY OF THE INVENTION

Therefore, the present invention provides a method, system, and program for determining a user's structural, external, and behavioral attributes which differ from traditional or standard user models and applying the detected differences to different avatar base models.

In one embodiment, a capture system captures detectable attributes of a user. A differential system compares the detectable attributes with a normalized model of attributes, wherein the normalized model of attributes characterize normal representative attribute values across a sample of a plurality of users and generates differential attributes representing the differences between the detectable attributes and the normalized model of attributes. Multiple separate avatar creator systems receive the differential attributes and each apply the differential attributes to different base avatars to create custom avatars which reflect reflects a selection of the detectable attributes of the user which are distinguishable from the normalized model of attributes.

The capture system captures one or more of structural attributes, external attributes, and behavioral attributes. To capture structural attributes one or more scanning systems map different depths of a user. To capture external attributes one or more image capture systems capture images of a user from one or more angles and combine the images to create a three-dimensional representation of the user. To capture behavioral attributes the capture system prompts the user to respond to instructions and the capture system associates captured speech and body movement associated with the response to a behavioral attribute.

The differential system may collect sets of a user attributes for a group of users at one point in time or over a period of time. The differential system detects at least one common attribute or range of common attributes for the group of users from the sets of user attributes. The differential system sets the common attribute or range of common attributes as the differential attributes representative of the group of users.

A storage system may store the user attributes, differential attributes, or custom avatars for a user. At other points in time, the user may authorize the capture system, the differential system, an avatar creator system, or a particular computing environment to access the stored user attributes, differential attributes, or custom avatars.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
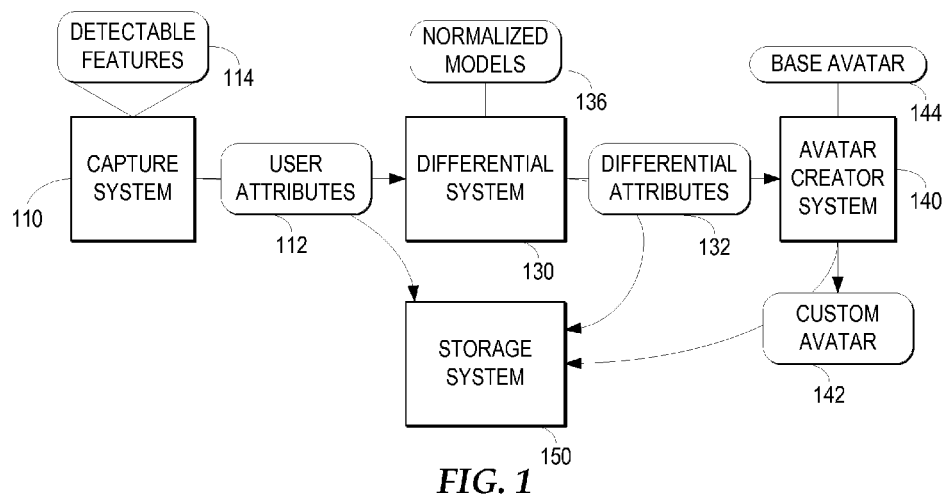
FIG. 1 is a block diagram depicting an example of a system, method and program which determines those features of a user which are distinguishable from a norm and applies the characteristics to one or more base avatars.

With reference to FIG. 1, a block diagram depicts examples of systems which may be implemented to create a customized avatar from captured detectable features of a user that reflects one or more distinguishable features of the user from the norm. It will be understood that additional or alternate components and systems, from the components and systems illustrated, may be implemented.

As illustrated, a capture system 110 captures a selection of one or more detectable features 114 of a user in two or more dimensions. Detectable features 114 may include, but are not limited to, structural, external and behavioral features. In one example, structural features may describe multiple depths of detectable structure and movement, including skin characteristics and movement and muscle and bone structure and movement. External features may describe features of a user which can be captured from capturing and analyzing visual and sensed images of a user. Behavioral features may include words spoken by a user, voice patterns of user speech, and detected external and structural movement which are associated with verbal responses, non-verbal responses and other user behavior. A user, as described herein, may refer to a person, an animal, and an object with detectable features. In additional, while structural features, external features, and behavioral features are described as different types of features, detectable features 114 may include the combination of one or more of these types of features.

In the example, capture system 110 analyzes object data for one or more of detectable features 114 collected by one or more capture devices, generates user attributes 112 specifying the structural, external and behavioral characteristics of one or more attributes of a user, and outputs user attributes 112. In particular, user attributes 112 may include, but are not limited to, a three dimensional structural model of a user, a three dimensional external model of a user, a voice characteristic model, and a behavioral or personality model.

User attributes 112 may include one or more types of models that represent a particular portion of a user's detectable features or represents a user's body type and proportions. For example, for a user's face, one or more models which represent the user's eyes within user attributes 112 may identify eye size, position, color, droop, frequency of blinking, changes in pupil size in response to certain triggers, and other detectable information about a user's eyes at a single point in time, over multiple points in time, and in response to questions or detectable stimulus. In another example, for a user's face, one or more models which represent the user's mouth within user attributes 112 may identify shape of lips, shape of smile, teeth shape, teeth visibility, coloring, and other detectable information about a user's mouth and smile at a single point in time, over multiple points in time, and in response to questions or detectable stimulus. In yet another example, for a user's hair, one or more models which represent the user's hair within user attributes 112 may identify the length of hair, the appearance of hair in different styles, the position of parts or identifiable directions of hair growth, hairline position, hair density, hair structure, hair coloring, and other detectable information about a user's eyes at a single point in time, over multiple points in time, and in response to questions or detectable stimulus. Other detectable characteristics within user attributes 112 may also include distinguishable accessories or adornments, such as glasses, including the position of the glasses, user behaviors in adjusting the glasses, and other detectable information about the glasses or other selected accessories or adornments. In distinguishing a user's body type or proportions, user attributes 112 may include measurements or may specify the size and proportion of each portion of a user in comparison with other portions.

It is important to note that additional or alternate capture systems may be implemented, where each capture system captures different types or ranges of areas of detectable features 114 and where a single capture system may analyze the different types of detectable features 114 and generate user attributes 112 or each capture system may separately analyze detectable features 114 and generate user attributes 112. In addition, it will be understood that capture system 110 may capture detectable features 114 for the same user at different points in time and generate a single set of user attributes 112 or generate user attributes 112 at each of the different points in time.

Next, differential system 130 receives user attributes 112 and compares user attributes 112 with normalized models 136. Differential system 130 detects the differences between user attributes 112 and normalized models 136 and outputs the differences as differential attributes 132. Normalized models 136 may include one or more models based on attribute samplings across one or more demographics of users. Normalized models 136 specify the base norm for one or more types of characteristics of attributes of users, such as a base norm for each of structural attributes, external attributes, and behavioral attributes. Differential system 130 may selectively apply one or more models from normalized models 136 based on the types of norms to which a particular user qualifies to be compared. By comparing user attributes 112 with normalized models 136, differential attributes 132 reflect those attributes of a user that are distinguishable from the norm.

It is important to note that differential system 130 may receive different sets of user attributes 112 for a same user from different capture systems or from one or more capture systems over a period of time. In addition, differential system 130 may receive multiple sets of user attributes 112 from different users, detect the differences between multiple sets of user attributes 112 and normalized models 136, and output differential attributes 132 which, for example, may specify the common differences for the group of users from normalized models 136 and the individual differences for users within the group from normalized models 136.

In addition, it is important to note that additional or alternate differential systems may be implemented, where each differential system compares different types of user attributes with normalized models 136. In addition, it is important to note that different differential systems may be implemented, where each different system compares a set of user attributes with different normalized models 136 available at the different differential systems.

An avatar creator system 140 receives differential attributes 132 and applies differential attributes 132 to a base avatar 144 to create a custom avatar 142 that reflects the distinguishable user attributes described in differential attributes 132. In particular, base avatar 144 represents a two or three dimensional model with at least one adjustable attribute which can be adjusted based on differential attributes 132. Base avatar 144 may be a stationary avatar or may include embedded scripts for controlling movement and responses by base avatar 144.

Avatar creator system 140 may output custom avatar 142 as an object, component, or other data entity within an environment that supports customized avatars. In addition, avatar creator system 140 may output custom avatar 142 to one or more network environments, network services, or other network entities which are registered with or accessible to avatar creator system 140.

Base avatar 144 and custom avatar 142 may represent multiple types of avatars including, but not limited to, an on-screen in-game persona of a user playing a game, a virtual representation of a user communicating within a chat room or via other network based communication channel, and an on-screen representation of a user in an on-line shopping environment. In one example, custom avatar 142 may be based on a base avatar 144 which, when incorporated into custom avatar 142, includes scripts or other functionality for adjusting and adapting the animation and behavior of custom avatar 142 responsive to the inputs and activity within a particular environment in which custom avatar 142 is output. As additional differential attributes for a user are detected, avatar creator system 140 may update custom avatar 142 with the additional differences, such that custom avatar 142 more accurately represents the distinguishable attributes of a user over time. In addition, or in another example, a particular computing environment may return information about the environment to avatar creator system 140, with which avatar creator system 140 may adjust custom avatar 142 and output the adjustments to the computing environment.

In the example, any of capture system 110, differential system 130 and avatar creator system 140 may facilitate user adjustment of the contents of user attributes 112, differential attributes 132, or custom avatar 142 to mask or adjust a particular detectable feature from among detectable features 114. In one example, capture system 110 may mask one or more detectable features from being distributed in user attributes 112 or may create one or more detectable features for distribution in user attributes 112. For example, a user profile may request that a mirror image of a user's right side be presented for the user's left side, wherein capture system 110 distributes user attributes 112 with those attributes of the left side of the body are detectable features of the right side of the body adjusted by capture system 110 to model the left side of the body. In another example, differential system 130 may detect one or more differential attributes for a user which are not symmetric or exceed a maximum range of difference and prompt the user to select whether to include the particular differential attributes or to minimize the particular differential attributes within differential attributes 132. In yet another example, avatar creator system 140 may prompt a user to select which differential attributes from among differential attributes 132 to apply to base avatar 144 or may prompt a user to select whether to apply one or more particular differential attributes which are beyond the normal differences applied to base avatar 144, such as an adornment which distorts a user's appearance more than what is typically detected.

In the example, capture system 110, differential system 130, and avatar creator system 140 may additionally or alternatively send user attributes 112, differential attributes 132, and custom avatar 142 to a storage system 150 or other analysis system. Storage system 150 may store one or more of user attributes, differential attributes and custom avatars for one or more users at a particular time or over multiple points in time. In addition, storage system 150 may analyze stored user attributes, differential attributes, and custom avatars or send the stored data to other systems for analysis.

In the example, capture system 110, differential system 130, avatar creator system 140 and storage system 150 are communicatively connected to at least one other system, as illustrated, via one or more of a network implementing one or more types of network architectures and hardware links. It is important to note that while capture system 110, differential system 130, avatar creator system 140 and storage system 150 are described as separate systems which are communicatively connected, in an additional or alternate embodiment, one or more of the systems may be implemented within a single system. In addition, one or more of capture system 110, differential system 130, avatar creator system 140, and storage system 150 and the processes, methods, and functions described with reference to these systems may be provided as services from service providers.

Although not depicted, capture system 110, differential system 130, avatar creator system 140, and storage system 150 may implement one or more security protocols or procedures to protect the transfer of data between the systems. In particular, each of user attributes 112, differential attributes 132, and custom avatar 142 may be associated with one or more users and the security protocols or procedures may require authentication of users or systems authorized by users to access or transmit user attributes 112, differential attributes 132, and custom avatar 142.

It is important to note that storage system 150 may represent one or more storage systems accessible via a network, where a user or service provider may direct storage of user attributes 112, differential attributes 132, and custom avatar 142 to storage system 150 via the network. In addition, storage system 150 may represent portable data storage systems, such as a portable communication device, a memory stick, or other portable devices that include memory.

It is important to note that user attributes 112, differential attributes 132, and custom avatar 142 may be created in real time or that at any point, user attributes 112, differential attributes 132 and custom avatar 142 may be stored and accessed at another point in time for use by another system. In addition, with regard to user attributes 112 and differential attributes 132, it is important to note that additional or alternate systems may receive user attributes 112 and differential attributes 132 and customize other types of services available to a user based on user attributes 112 and differential attributes 132.

Figure 2:
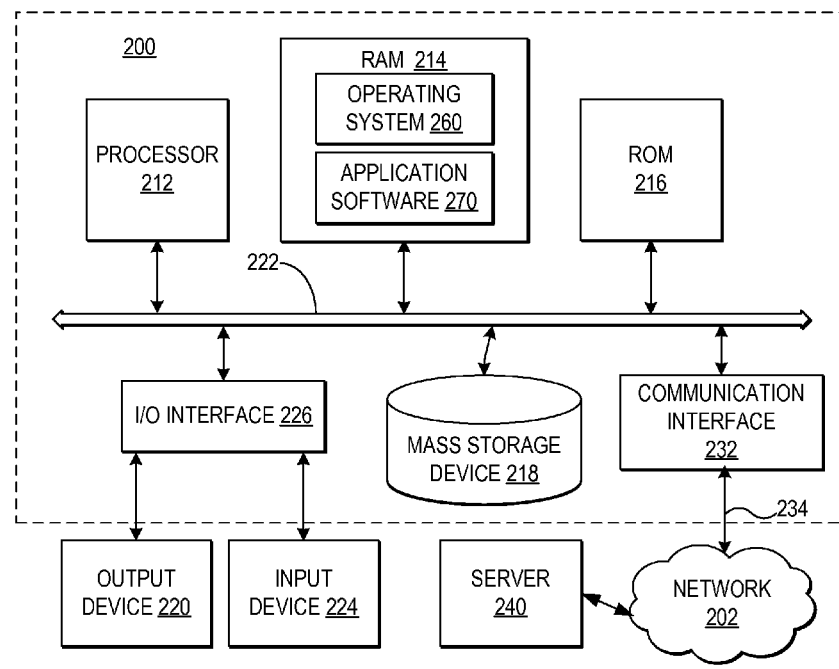
FIG. 2 is a block diagram illustrating one example of a computing system in which the present invention may be implemented.

With reference now to FIG. 2, a block diagram depicts one embodiment of a computing system in which the present invention may be implemented. The controllers and systems of the present invention may be executed in a variety of systems, including a variety of computing systems, such as computer system 200, communicatively connected to a network, such as network 202.

Computer system 200 includes a bus 222 or other communication device for communicating information within computer system 200, and at least one processing device such as processor 212, coupled to bus 222 for processing information. Bus 222 includes low-latency and higher latency paths that are connected by bridges and adapters and controlled within computer system 200 by multiple bus controllers. When implemented as a server, computer system 200 may include multiple processors designed to improve network servicing power. Where multiple processors share bus 222, an additional controller (not depicted) for managing bus access and locks may be implemented.

Processor 212 may be a general-purpose processor such as IBM's PowerPC™ processor that, during normal operation, processes data under the control of an operating system 260, application software 270, middleware (not depicted), and other code accessible from a dynamic storage device such as random access memory (RAM) 214, a static storage device such as Read Only Memory (ROM) 216, a data storage device, such as mass storage device 218, or other data storage medium. In one example, processor 212 may further implement the CellBE architecture to more efficiently process complex streams of data in three-dimensions at a multiple depths. It will be understood that processor 212 may implement other types of processor architectures. In addition, it is important to note that processor 212 may represent multiple processor chips connected locally or through a network and enabled to efficiently distribute processing tasks.

In one embodiment, the operations performed by processor 212 may control capturing three-dimensional external features, multiple depths of structural features, and behavioral features, describing the features as user attributes, comparing the user attributes with at least one normalized model, generating differential attributes specifying the differences between the user attributes and the normalized model, and customizing an avatar with the differential attributes, such that the avatar reflects those features or attributes of a user which are distinguishable from the norm, as described in the operations of the flowcharts of FIGS. 7-10 and other operations described herein. Operations performed by processor 212 may be requested by operating system 260, application software 270, middleware or other code or the steps of the present invention might be performed by specific hardware components that contain hardwired logic for performing the steps, or by any combination of programmed computer components and custom hardware components.

The present invention may be provided as a computer program product, included on a computer or machine-readable medium having stored thereon the executable instructions of a computer-readable program that when executed on computer system 200 cause computer system 200 to perform a process according to the present invention. The terms "computer-readable medium" or "machine-readable medium" as used herein includes any medium that participates in providing instructions to processor 212 or other components of computer system 200 for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 200 can read and which is suitable for storing instructions. In the present embodiment, an example of a non-volatile medium is mass storage device 218 which as depicted is an internal component of computer system 200, but will be understood to also be provided by an external device. Volatile media include dynamic memory such as RAM 214. Transmission media include coaxial cables, copper wire or fiber optics, including the wires that comprise bus 222. Transmission media can also take the form of acoustic or light waves, such as those generated during radio frequency or infrared data communications.

Moreover, the present invention may be downloaded or distributed as a computer program product, wherein the computer-readable program instructions may be transmitted from a remote computer such as a server 240 to requesting computer system 200 by way of data signals embodied in a carrier wave or other propagation medium via network 202 to a network link 234 (e.g. a modem or network connection) to a communications interface 232 coupled to bus 222. In one example, where processor 212 includes multiple processor elements, then a processing task distributed among the processor elements, whether locally or via a network, may represent a computer program product, where the processing task includes program instructions for performing a process or program instructions for accessing Java (Java is a registered trademark of Sun Microsystems, Inc.) objects or other executables for performing a process. Communications interface 232 provides a two-way data communications coupling to network link 234 that may be connected, for example, to a local area network (LAN), wide area network (WAN), or directly to an Internet Service Provider (ISP). In particular, network link 234 may provide wired and/or wireless network communications to one or more networks, such as network 202. Further, although not depicted, communication interface 232 may include software, such as device drivers, hardware, such as adapters, and other controllers that enable communication. When implemented as a server, computer system 200 may include multiple communication interfaces accessible via multiple peripheral component interconnect (PCI) bus bridges connected to an input/output controller, for example. In this manner, computer system 200 allows connections to multiple clients via multiple separate ports and each port may also support multiple connections to multiple clients.

Network link 234 and network 202 both use electrical, electromagnetic, or optical signals that carry digital data streams. The signals through the various networks and the signals on network link 234 and through communication interface 232, which carry the digital data to and from computer system 200, may be forms of carrier waves transporting the information.

In addition, computer system 200 may include multiple peripheral components that facilitate input and output. These peripheral components are connected to multiple controllers, adapters, and expansion slots, such as input/output (I/O) interface 226, coupled to one of the multiple levels of bus 222. For example, input device 224 may include, for example, a microphone, a video capture device, a body scanning system, a keyboard, a mouse, or other input peripheral device, communicatively enabled on bus 222 via I/O interface 226 controlling inputs. In addition, for example, an output device 220 communicatively enabled on bus 222 via I/O interface 226 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 2 may vary. Furthermore, those of ordinary skill in the art will appreciate that the depicted example is not meant to imply architectural limitations with respect to the present invention.

Figure 3:
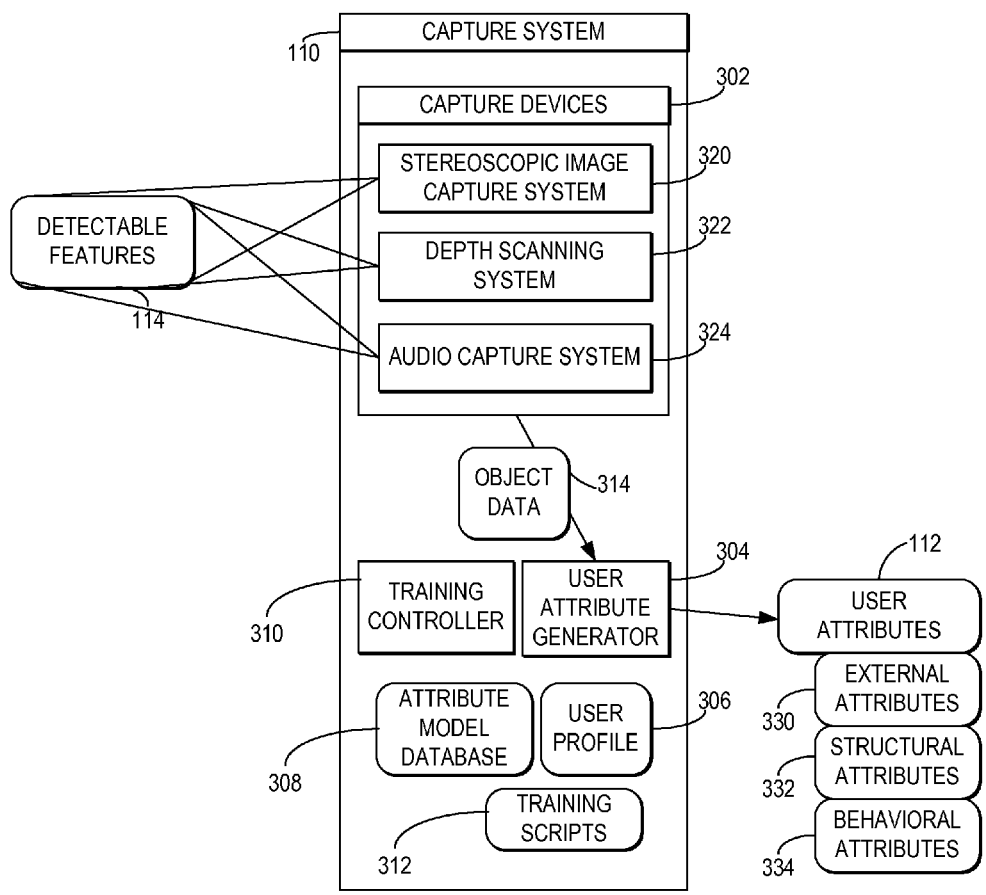
FIG. 3 is a block diagram depicting one example of components of a capture system.

Referring now to FIG. 3, a block diagram depicts one example of components of a capture system. In additional or alternate embodiments, additional or alternate components may be implemented in a capture system.

In the example, capture system 110 includes one or more capture devices 302 for capturing one or more features of a user which are referred to as detectable features 114. It is important to note that while capture devices 302 are illustrated within capture system 110, capture devices 302 may be implemented by systems separate from capture system 110.

In one example, capture devices 302 includes a stereoscopic image capture system 320. Stereoscopic image capture system 320 includes multiple video or other image capture devices which capture image streams from multiple angles and other types of sensors to detect outlines of objects or other data points within a capture area. Based on captured image streams and sensed data points, stereoscopic image capture system 320 tracks particular objects within image streams, processes the data from the image streams to detect properties of tracked objects within each of the streams, and processes the tracked object data to identify three-dimensional properties of objects. Based on the tracked and identified three-dimensional properties of objects, stereoscopic image capture system 320 generates object data 314 which identifies objects and the characteristics of the objects, including describing surface textures and colors. Stereoscopic image capture system 320 may include multiple servers, including multiple processors, and one or more databases of object descriptions implemented to process each of the image streams, track objects within captured image streams, identify the objects being tracked, and combine the two dimensional tracked objects into three-dimensional tracked objects. It is important to note that in tracking and processing objects within image streams, stereoscopic image capture system 320 may identify and track user external features, including, but not limited to, user surface characteristics, user movement, user facial features, user temperatures, and user textural features, such as changes in skin texture from perspiration.

In another example, capture devices 302 includes a depth scanning system 322. Depth scanning system 322 may include multiple scanning systems and analysis systems which enable scanning and analysis of scans of a user at different depths. For example, depth scanning system 322 may include a laser system which detects points representing the surface of the user and maps a grid representing a user profile projected from the detected laser points. In addition, depth scanning system 322 may include a sonar system which detects data points within a scan area representing a user's physical shape separate from clothing and maps the data points to a graph representing a user profile without adjustments for clothing or other objects. Further, depth scanning system 322 may include an ultrasonic scanning system which detects the position and movement of muscles and bones beneath the skin which are part of the features of a user or of user movement and maps the movements to three-dimensional object graphs.

In particular, depth scanning system 322, tracks data points at a particular three-dimensional depth of a user, identifies the data points as features of the user, and generates object data 314 which includes maps and other data indicating tracked and analyzed portions of user appearance, user structure, and user movement. Depth scanning system 322, in scanning for one or more scannable depths, may include multiple servers, including multiple processors, and one or more databases of object descriptions implemented to process each of the depth mappings representative of a user profile or underlying structure of a user. In addition, depth scanning system 322 may implement additional sensors or analysis of detected data points to distinguish between captured depth points representing a user and captured depth points representing the background or other objects within a capture area.

In yet another example, capture devices 302 includes an audio capture system 324. Audio capture system 324 captures audible noise made by the user within a capture area, processes the captured noise, and outputs the processed audio as object data 314. Audio capture system 324 may process captured audio to detect an audio signature of a user or may process captured audio to convert audio into text.

Each of the systems described as examples of capture devices 302 may distinguish between multiple users or objects within a capture area. For example, as previously noted, each of the systems may include additional sensors which track the position of different users or objects, such as through temperature sensing and other types of sensing which identify the outlines of different objects. Further, each of the systems may distinguish between multiple users through detecting differences in physical appearance or voice characteristic. In addition, each of the systems described as examples of capture devices 302 may share captured data to more efficiently distinguish between multiple users.

In addition, each of the systems described as examples of capture devices 302 may identify one or more users within a capture area, access profiles for the identified users with previously detected features from storage system 150 or other storage, and more efficiently and accurately analyze current user detectable features in view of previously detected features from accessed profiles. For example, capture devices 302 may capture biometric information, such as one or more facial features, a fingerprint, or a voice sample, and compare the captured information with a biometrics database to match the captured biometric information with a particular user record within the biometrics database. In another example, capture devices 302 may capture identifying information by reading or detecting a portable identification device affixed to or carried by a user. In one example, capture devices 302 may detect an identification badge on a user and convert the image of the badge from a video stream into text which identifies the user.

Each of the systems described as examples of capture devices 302 may capture detectable features 114 within a same or different sized capture areas. For example, stereoscopic image capture system 320 may scan a first three-dimensional capture area which includes a user's face and depth scanning device 322 may scan a larger capture area which also includes a user's torso and arms.

Capture devices 302 transmit or send object data 314 to one or more of user attributes generator 304 and training controller 310. In addition, capture devices 302 may transmit or send object data 314 to additional analysis systems which perform additional analysis of object data 314 to more accurately identify and specify detectable features within object data 314.

Training controller 310 receives object data 314 and associates object data 314 with a particular behavioral attribute. Behavioral attributes may include, for example, non-verbal communications, verbal communications, and responses to questions and other stimuli. In a first example, training controller 310 runs training scripts 312 which prompt a user via a user interface to respond to a word, picture, or other scenario, to perform a particular action, to speak a particular word or phrase, to make a particular type of noise, or to follow other types of instructions. Training controller 310 compares the time stamps on object data 314 with the time a user is prompted with an instruction to determine which types of object data is a response to the instructions provided. In addition, training controller 310 may filter out selections of object data which are not within the expected range of a response to a particular instruction. Once training controller 310 identifies one or more object data records which represent a user response to a particular instruction, training controller 310 associates the selected object data records with the behavioral attribute associated with the particular instruction.

In one example, training scripts 312 may prompt a user to speak particular words or phrases and training controller 310 captures the object data records which include audio spoken by the user of the particular words or phrases, to generate a database of voice samples of a user. From the voice samples, training controller 310 may pass the voice samples identified as the user speaking a particular word to user attribute generator 304 for distribution in user attributes 112. In another example, from the voice samples, training controller 310 may identify the voice characteristics or signature of a user and pass the voice characteristics to user attribute generator 304 for distribution in user attributes 112.

In another example, training scripts 312 may show a user a picture or present a scenario to a user designed to elicit a particular type of emotional response, such as a humored laugh. Training controller 310 captures the object data records which include facial expression and head and shoulder movement of the user and marks the movements in association with the behavior of humored laugh. In addition, training controller 310 captures the object data records which record the sound of the user's humored laugh and marks the captured sound with the behavior of humored laugh.

In yet another example, training scripts 312 may request that a user perform a particular action, such as a smile. Training controller 310 captures the object data records which indicate external and structural movement when a user smiles and marks the movement associated with the action of smiling.

Capture system 110 may include training scripts 312 or may access training scripts 312 from other systems. For example, avatar creator system 140 may publish training scripts 312 for access by capture system 110 to use in prompting a user to perform actions, speak words or respond to questions that are applicable to the adjustable characteristics of base avatar 144.

In addition to training controller 310 prompting a user to respond to a trigger and recording the user's response from object data, training controller 310 or capture devices 302 may, in analyzing captured data or object data 314, compare captured data or object data 314 with user profile 306 to correlate currently detected object data with previously detected behavioral attributes of a user.

User attribute generator 304 receives object data 314 and updated object data with an associated behavior or trigger from training controller 310 and converts the object data into user attributes 112. As illustrated in the example, user attributes 112 may include one or more of external attributes 330, structural attributes 332, and behavioral attributes 334. Each of these types of attributes may be represented through textual references, such as a color of clothing represented by a numerical color code or a behavior represented by a degree of that behavior interpreted by training controller 310, such as calm, mildly irritated, or angry. In addition, each of these types of attributes may be represented by a graphical representation of the captured image of the user, such as a three dimensional graphical data mapping of a user's external appearance or a three dimensional map of the surface of the user as detected by sonar. In addition, the types of attributes may be represented by verbal representations and may include captured verbal and physical responses to scripted questions.

In one example, user attributes generator 304 compares object data with one or more attribute models from attribute models database 308 to select and define one or more specific user attributes from among multiple possible attributes and other data which may be included in the object data. In one example, attribute model database 308 may include attribute models which filter out object data which does not describe a particular attribute, such as filtering out all object data which does not describe the color, position, and movement of a user's hair. In another example, attribute model database 308 may include attribute models which include specifications for combining different types of object data into a more complete representation of a user, such as by combining the movements of the user in three-dimensional images of the user generated by stereoscopic image capture system 320 with the muscular mapping of the user during the same movements as captured by depth scanning system 322. In yet another example, user attribute generator 304 may access previously captured object data and previously created user attributes for a user from a user profile 306 and apply the previous information to an attribute model with current information to create a more complete image of a user, such as when stereoscopic image capture system 320 only captures current facial features, however user profile 306 also includes previously captured structural object data for a user.

As already noted, user attributes generator 304 may access user profile 306 when analyzing object data and creating user attributes 112. In particular, user attribute generator 304 may analyze, filter out, or compile object data in view of user profile 306. User profile 306 may include, but is not limited to, previously captured user attributes, previously captured differential attributes for the user, previously rendered custom avatars, size and shape specifications for a user, coloring specifications for a user, and other information about user physical, structural, and behavioral characteristics which user attribute generator 304 analyzes when creating user attributes 112. User attribute generator 304 may access user profile 306 from a client system at which a user is logged on, at a server system that has identified the user, or from other systems which store and transmit user profile 306.

Importantly, because depth scanning system 322 may be cost prohibitive to many users, user profile 306 may include the object data and compiled user attributes from depth scanning system 322 from a service provider which provides data scanned by depth scanning system 322 to a user. In real-time, however, user attribute generator 304 may combine the depth characteristics of a user from user profile 306 with current real-time captured images of a user by stereoscopic image capture system 320 to user attributes 112 which include a composite of real-time and previously captured images.

Figure 4:
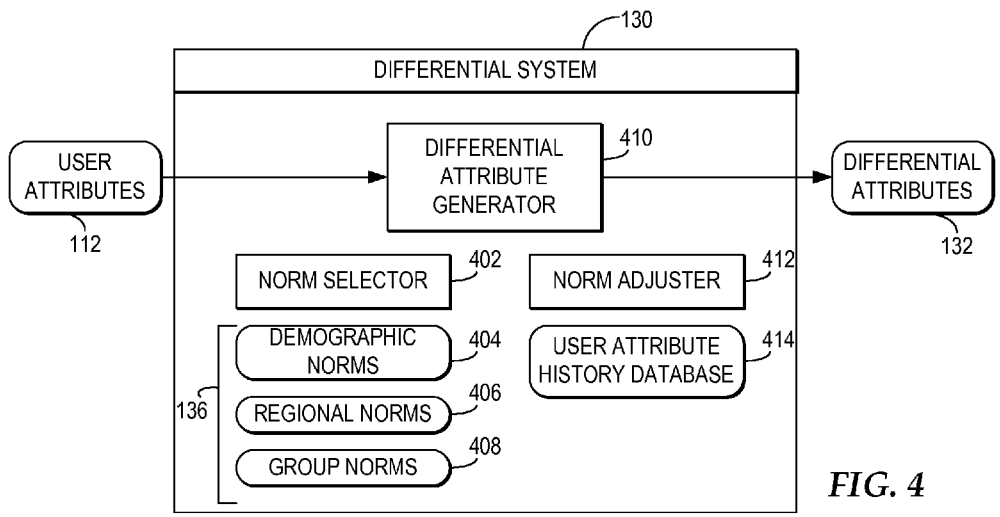
FIG. 4 is a block diagram illustrating one example of components of a differential system.

With reference now to FIG. 4, a block diagram illustrates one example of components of a differential system. In additional or alternate embodiments, additional or alternate components may be implemented in a differential system.

In the example, differential system 130 includes a differential attribute generator 410 which receives user attributes 112, compares user attributes 112 with one or more selected models from normalized models 136, and outputs the differences between user attributes 112 and the selected models as differential attributes 132. In selecting the differences between user attributes 112 and the selected models, differential attribute generator 410 may select to include the original attribute within differential attributes 132 or may select to include text, graphical mappings, sounds, or other data which represents the computed difference between a particular user attribute and a particular attribute of a selected model. Regardless of the way the differences between user attributes 112 and the selected models are described, differential attributes 132 represent those attributes which are distinguishable about a user or group of users in comparison with detected or defined norms among users.

In one example of creating differential attributes 132, for spoken words within user attributes 112, differential attribute generator 410 may include a speech comparator or synthesizer for detecting speech characteristics within user attributes 112, comparing the speech characteristics with a range of normal speech characteristics selected from normalized models 136, and detecting speech characteristics within user attributes 112 which are outside a range of normal characteristics of speech for the words. By detecting the user's speech characteristics for the words are outside a range of normal characteristics, differential attribute generator 410 may select to include, within differential attributes 132, the speech file from user attributes 112 for the spoken words by the user which are outside the range of normal characteristics. Alternatively, by detecting the user's speech characteristics for the words are outside a range of normal characteristics, the speech comparator of differential attribute generator 410 may compare the wave forms for the user's speech from user attributes 112 and the model speech from normalized models 136, compute the differences in the waves and output the differences between the wave forms in differential attributes 132.

In another example of creating differential attributes 132, for external attributes, differential attribute generator 410 compares the external attributes with a selected model with normalized external attributes with ranges of normalized sizes, shapes, textures, colors, and other characteristics. In one example, differential attribute generator 410 may detect those portions of a user's external image represented by user attributes 112 which are outside the normalized ranges and filter user attributes 112 into differential attributes 132 that only includes those attributes which are outside the normalized ranges. In another example, differential attribute generator 410 may detect those portions of a user's external image represented by user attributes 112 which are outside the normalized ranges, compute the differences between the normalized ranges and the selected user attributes, and output the computed differences in differential attributes 132.

It is important to note that differential system 130 may receive user attributes specified for different users and create differential attributes for each user attribute record. In addition, differential system 130 may receive user attributes specified for different users and create a single differential attribute record which includes one or more of the common differences between the user attributes and the selected model and the unique differences for each of the user attribute records and the selected model. In one example of differential system 130 receiving user attributes specified for different users, differential system 130 may receive the user attributes for different members of a family and generate in differential attributes 132 one or more of the attributes common among the family members, the common differences for the family from the selected models, and unique characteristics of each family member which are different from the selected models.

In the example, differential system 130 includes a norm selector 402. Norm selector 402 designates the selected models for application by different attribute generator 410 to one or more sets of user attributes. Norm selector 402 designates the selected models from among normalized models 136 based on one or multiple factors, including, but not limited to, user specified factors, factors specified for a particular differential system, and factors specified by avatar creator system 140. In one example, norm selector 402 detects user specified factors from user attributes 112 which include additional information about a user indicating which types of norms may apply to a particular user. In another example, norm selector 402 detects user specified factors from user attributes 112 or other user input which specifies particular norms to be applied or which specifies the norms used by a particular avatar creator system to which differential attributes 132 are to be output.

As one example, normalized models 136 includes multiple types of models specified according to demographic norms 404, regional norms 406, and group norms 408. It will be understood that normalized models may be specified according to other criteria. For example, demographic norms 404 may be specified according to traditional criteria for grouping people according to external attributes, structural attributes, behavioral attributes, or other types of normalized attributes. Regional norms 406 may include normalized external attributes, structural attributes, and behavioral attributes for a particular region or definable area where people share similar attribute characteristics. Group norms 408 may include, for example, normalized external attributes, structural attributes, and behavioral attributes for a specified group, such as a family, team, or other group of people who may or may not share similar attribute characteristics.

Differential system 130 may access one or more types of normalized models 136 from one or more systems which maintain different types of normalized models. In addition, differential system 130 includes a norm adjuster 142 which tracks current trends in user attributes and generates or adjusts one or more of the types of normalized models 136. In particular, Norm adjuster 412 tracks user attributes received over time in user attribute history database 414. Periodically or in real-time, norm adjuster 412 analyzes user attribute history database 414 to identify similar attributes among multiple sets of user attributes from one or more users. Based on the similar attributes detected by norm adjuster 412 in user attribute history database 414, norm adjuster 412 may create a new model for current norms or may adjust the models for one of the existing norms. In particular, it is important to note that user attribute history database 414 may classify users according to demographic, region, or group, such as a family, and detect similarities and differences for different norm types.

It is important to note that by comparing user attributes 112 with normalized models 136 and generating differential attributes 132, differential attributes 132 specifies those attributes of a user which distinguish the user from other users. By specifying those attributes of a user which distinguish the user from other users at differential system 130, differential system 130 may distribute differential attributes 132 concurrently to different avatar creator systems which then adjust avatars to reflect those attributes of a user which are distinguishably noticeable from the norm. Therefore, differential system 130 reduces the amount of data sent to avatar creator systems or processed by avatar creator system when generating custom avatars. In addition, differential system 130 allows separate providers to customize avatars for separate environments without the user having to separately provide and enter raw user attributes with each separate provider.

Figure 5:
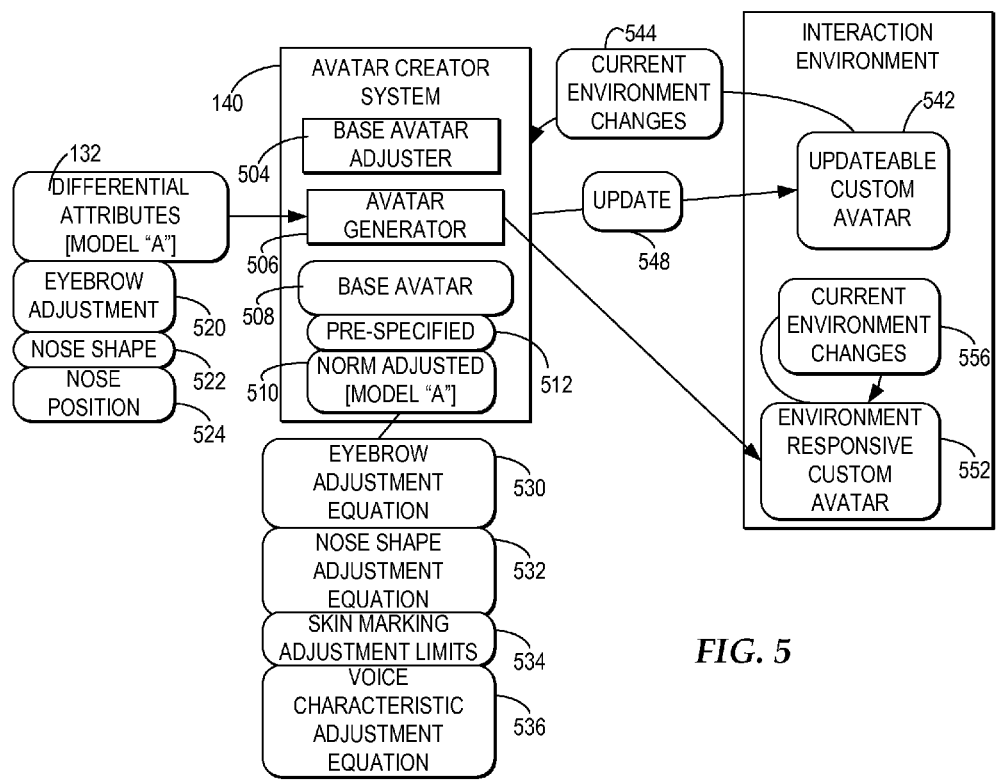
FIG. 5 is a block diagram depicting one example of components of an avatar creator system.

Referring now to FIG. 5, a block diagram illustrates one example of components of an avatar creator system. In additional or alternate embodiments, additional or alternate components may be implemented in an avatar creator system.

Avatar creator system 140 receives differential attributes 132 from one or more differential systems, applies differential attributes 132 to a base avatar 508 and outputs the customized avatar to one or more environments. As previously described, an avatar can represent a static or interactive three-dimensional graphical or video based representation of a user or a static or interactive a two-dimensional graphical or video based representation of a user. In representing a user or group of users, a custom avatar output by avatar creator system 140 reflects a user or group of user's distinguishable attributes. A user's distinguishable attributes may include, but are not limited to, external, structural, and behavioral attributes.

In particular, avatar creator system 140 includes an avatar generator 506 which receives differential attributes 132 and applies differential attributes to a base avatar to generate custom avatar 142. Avatar creator system 140 may include base avatars 508 that are pre-specified for adaptation in comparison with one or more of the models from normalized models 136 or pre-specified for adaptation independent of the normalized model, as illustrated by pre-specified base avatars 512. In addition, when avatar generator 506 detects differential attributes based on a normalized model which is not included within pre-specified base avatars 512, a base avatar adjuster 504 may generate a norm adjusted base avatar 510 by accessing the model on which the differential attributes are based from differential system 130 and adjusting a base avatar in view of the model.

It is important to note that base avatars 508 may be defined to be adjusted based on features of a person to reflect the distinguishable attributes of that person, however, base avatars 508 may or may not result in an image which exactly reflects the actual image of a person. In one example, base avatars 508 define a graphical image that is adjustable to represent a mirror image of the actual image of a person. In another example, base avatars 508 define a graphical image that is adjustable to include those attributes which distinguish a person based on the captured image of the person. For example, base avatar 508 may represent an animated character in a game, where attributes of the animated character are adjustable based on differential attributes 132 to create a custom avatar that reflects those attributes which distinguish a particular user. Importantly, because differential attributes 132 already represent three-dimensional, depth based, behavior reflective attributes of a user which are distinguishable from a normalized model, when applying differential attributes 132 to any one of base avatars 508, avatar creator system 140 is enabled to create custom avatars which reflect those attributes of a particular user which distinguish that particular user at a fine level of granularity.

In one example, differential attributes 132 includes attribute adjustments for a particular user from a particular norm adjusted model marked as model "A". In particular, for purposes of illustration, differential attributes 132 specifies an eyebrow adjustment 520, a nose shape 522, and a nose position 524 as each of the attributes deviate from normalized model "A". In addition, in the example, norm adjusted base avatar 510, based on model "A" includes equations and limitations for applying differential attributes to the base avatar.

For example, base avatars 508 may include equations for applying a differential attribute as an attribute of a custom avatar. For example, norm adjusted base avatar 510 includes equations based on a particular normalized model for calculating an eyebrow adjustment 530, a nose shape adjustment 532, and a voice characteristic adjustment 534 from differential attributes computed based on a normalized model "A". In one example, those portions of base avatar 508 which are adjusted to reflect differential attributes are distinguishable because user attributes are represented. In another example, those portions of base avatar 508 which are adjusted to reflect differential attributes may be graphically distinguished in a manner so that from the resulting custom avatar, one can graphically see the differential attributes.

In addition, base avatars 508 may include limits for attribute placements. For example, a skin marking adjustment limit 534 may limit the type and number of distinguishable skin markings that may be applied to a base avatar. In one example, where a base avatar represents a character in a game, limits may be placed on the types or intensity of deviations from the base model to reflect the distinguishable attributes of a user in order to maintain the integrity of the character when customizing the character based on differential attributes 132.

As previously noted, avatar generator 506 adjusts base avatars 508 to create custom avatar 142 which reflects the distinguishable attributes of a user. In addition, base avatar 508 may include equations which apply differential attributes 132 to reflect how a user would appear if the user's attributes were adjusted. For example, base avatar 508 may include equations which detect a differential attribute identifying a weakness in a user and adjust the attribute of the custom avatar to represent how a user would look with changes to structure, such as changes in muscle strength, changes to external appearance, or changes to behavior. In another example, base avatar 508 may represent a particular age norm with equations for applying differential attributes 132 to reflect how a user would appear at a particular age or age range. In addition, base avatar 508 may include equations which set the custom avatar to a particular age and then begin regressively or progressively aging the custom avatar, displaying differential attributes 132 as they would appear at a younger or older age.

As illustrated in the example, differential attributes 132 may include attributes for which base avatars 508 does not include equations or limits and base avatar 508 may include equations for adjustment of some attributes which are not defined in differential attributes 132. In one example, in addition to adjusting base avatars 508 based on differential attributes 132, avatar creator system 140 may provide a user interface through which a user may select to adjust attributes of base avatars 508 from the adjustment based on differential attributes 132 or from standard level.

Base avatars 508 may represent avatar objects which can be placed in an interactive environment and include scripts and other data which allow the avatar to independently interact within the environment. Thus, for example, avatar generator 506 may generate, from base avatars 508, environment responsive custom avatar 552 and output environment responsive custom avatar 552 into an interactive environment 540. As the condition of data, objects, inputs and outputs and other data changes within interactive environment 540, environment responsive custom avatar 552 detects the current changes 556 and automatically adjusts a current response based on the current conditions. In particular, because base avatars 508 include behavioral attributes which are customizable, environment responsive custom avatar 552 includes scripts or other controls for the avatar to conduct itself. Behavior is not limited to reacting to interactive environment 540, but also includes the scripts directing how environment responsive custom avatar 552 learns about the environment and perceives the environment.

In addition, or alternatively, base avatar 508 and norm adjusted base avatar 510 may represent avatar objects which are not independently responsive to an environment. Thus, for example, avatar generator 506 may generate from base avatar 508 or 510, updateable custom avatar 542 and output updateable custom avatar 542 into interactive environment 540. In the example, interactive environment 540 returns the current environment changes 544 to avatar creator system 140. Avatar generator 506 determines the required adjustment to the movement or behavior of updateable custom avatar 542 and sends an update 548 with instructions for updateable custom avatar to adjust. Alternatively, avatar generator 506 may send a new custom avatar object with the updates to interactive environment 540.

It is important to note that interactive environment 540 may represent one or more of at least one separate computer systems, a selection of resources, and a display environment. Avatar generator 506 may send different instances or embodiments of a custom avatar to different interactive environments in parallel. In addition, avatar generator 506 may send multiple instances of a custom avatar to a same interactive environment.

In addition, it is important to note that in addition to environment responsive custom avatar 552 and updateable custom avatar 542, avatar generator 506 may generate other types of custom avatars based on the type of base avatar implemented. Additionally, it is important to note that avatar generator 506 may generate custom avatars with different levels of complexity dependent upon the resources available to the interaction environment in which the avatar will be placed.

Figure 6:
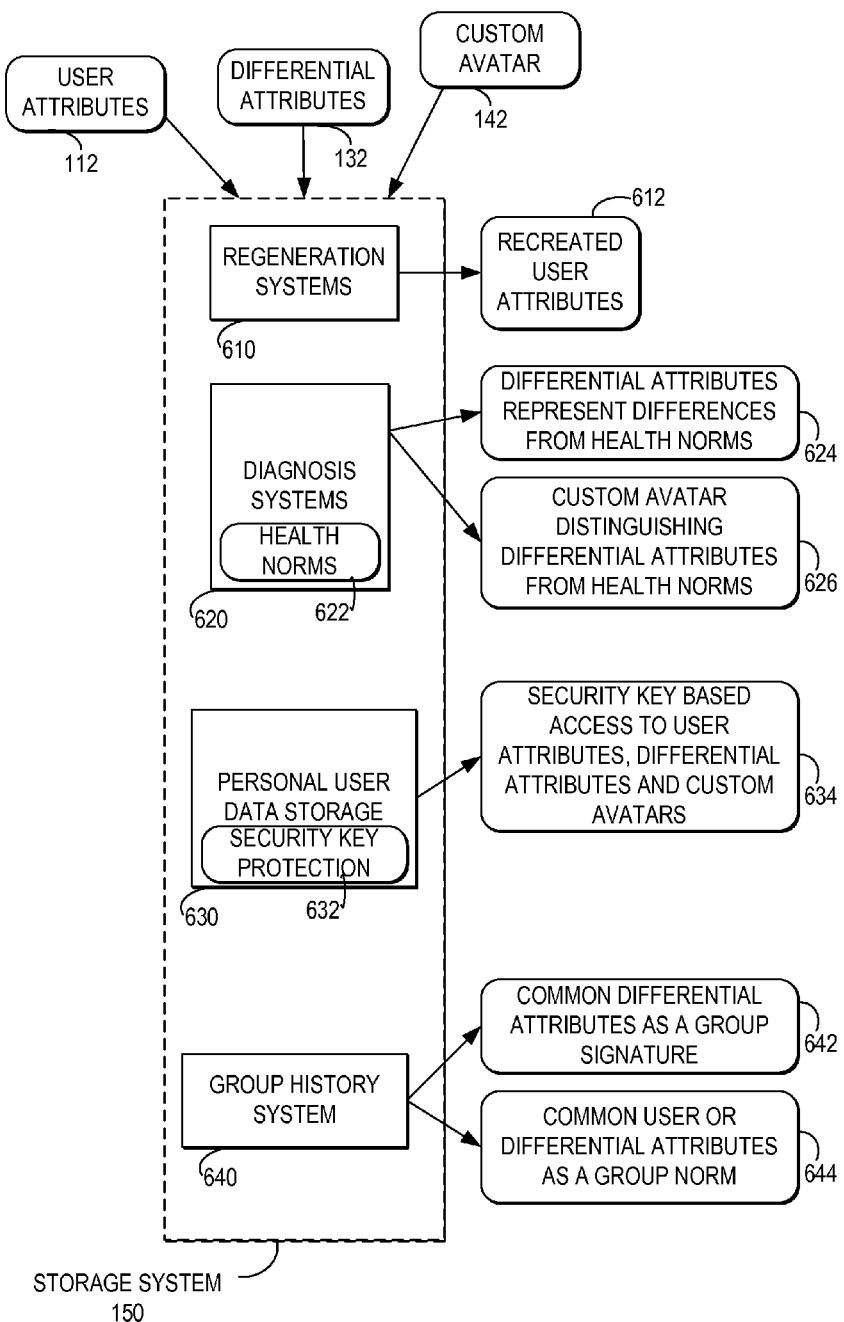
FIG. 6 is a block diagram illustrating examples of storage systems which store and analyze one or more of collected user attributes, differential attributes, or custom avatars.

Referring now to FIG. 6, a block diagram illustrates examples of storage systems which store and analyze one or more of collected user attributes, differential attributes, or custom avatars. It will be understood that in additional or alternate embodiments, other types of storage systems may be implemented.

As illustrated, storage system 150 may represent multiple types of storage systems. As illustrated, a system functioning as storage system 150 may receive one or more of user attributes 112, differential attributes 132, or custom avatar 142 for one or more users from one or more capture systems, differential systems, or avatar creator systems at one time or over multiple points in time. Although not depicted, each of the examples of storage system 150 may implement data storage structures to categorize and store received user attributes 112, differential attributes 132, or custom avatar 142. In addition, each of the examples of storage system 150 may include components described with reference to differential system 130 and avatar creator system 140 for creating differential attributes or custom avatars.

In one example, of storage system 150, a regeneration system 610 stores user attributes or differential attributes or accesses stored user attributes or differential attributes for a particular user. At a later point in time, if the user needs to have reconstructive surgery to recreate a user feature as captured and stored at a previous point in time, regeneration system 610 adjusts current user attributes with the captured user attributes or differential attributes from a previous point in time to generate recreated user attributes 612. In one example, recreated user attributes 612 include previously captured user attributes merged with current user attributes. In another example, recreated user attributes 612 specify the previously captured user attributes which are different from the current user attributes. Further, in another example, recreated user attributes 612 specify previously captured user attributes such that a user may request an avatar creator system create a custom avatar for the user based on the user's captured characteristics at a particular point in time.

In one example of implementation of regeneration system 610, if a user suffers from an injury, but has a previously captured set of user attributes, regeneration system 610 receives current captured user attributes and compares the currently captured user attributes with the previously captured set of user attributes to detect the changes from the injury, similar to the comparison performed by differential system 130. From the difference detected between the previously captured user attributes and current user attributes, regeneration system 610 may prompt a user to select which of the portions of the previously captured user attributes which are different from the current user attributes should be applied to the current attributes. In another example, from the difference detected between the previously captured user attributes and current user attributes, regeneration system 610 may prompt a user to select which of the portions of the previously captured user attributes which are different from the current attributes should be distinguished in recreated user attributes 612. Importantly, since user attributes may include the mapped characteristics of a user at multiple depths and in three-dimensions, by accessing previously captured user attributes, even if the user attributes were previously captured for updating an avatar, medical professionals may use recreated user attributes 612 as a guide for recreating a user body part, for performing reconstructive surgery after an injury, and for monitoring rehabilitation.

In another example of storage system 150, a diagnosis system 620 stores user attributes or differential attributes or accesses stored user attributes or differential attributes for a particular user. Diagnosis system 620 compares the accessed attributes with a database of health models in health norms 622.

In one example, health norms 622 of diagnosis system 620 may include models similar to normalized models 136, but focused on normalized health attributes. The health models may include a model of health for a particular time or specify a progression of health over a span of time. Diagnosis system 620 detects the differences between user attributes at the current time or over a span of time and outputs the differences as differential attributes representing the differences from health norms, as illustrated at reference numeral 624. In addition, diagnosis system 620 may perform additional analysis of the differential attributes, diagnose current health problems or potential health problems based on the degree of difference in the differential attributes, and recommend a health plan for correcting current health problems or potential health programs. Importantly, since user attributes may include mapped characteristics of a user at multiple depths and in three-dimensions, by accessing a span of user attributes, even if the user attributes were previously captured for updating an avatar, diagnosis system 620 may apply the user attributes for identifying current health problems and identifying future health problems based on three-dimensional representations external and structural representations of a user and based on behavioral representation of a user which allow for tracking changes in mental health.

In another example, diagnosis system 620 may generate a custom avatar with a base avatar based on health norms 622, as described with reference to avatar creator system 140. Diagnosis system 620, however, creates a custom avatar which graphically distinguishes the differential attributes from the health norm model as illustrated at reference numeral 626. In graphically distinguishing differential attributes from the health norm model on a custom avatar, in one example, diagnosis system 620 may apply a distinguishable coloring to the differential attributes when illustrated on the custom avatar. Diagnosis system 620 may further graphically distinguish differential attributes which indicate an injury or problem area based on the differences between the differential attributes and the health norms. In another example, in graphically distinguishing differential attributes from the health norm model on a custom avatar, diagnosis system 620 may provide pop up or additional graphical windows which point to and describe the differential attributes. It will be understood that additional or alternate graphical or audible adjustments may be applied to distinguish the differential attributes as applied to a health norm model generated into a custom avatar.

In yet another example of storage system 150, a personal user data storage system 630 stores one or more of user attributes, differential attributes and custom avatars from a single point of time or over a span of time secured by a security key protection 632 or other security access controller. In one example, personal user data storage system 630 secures accesses to the stored data according to whether the requirements of security key protection 632 are met. In another example, personal user data storage system 630 applies security key protection 632 to data stored on or accessed from personal user data storage system 630. It is important to note that by enabling security key based access to user attributes, differential attributes, and custom avatars, as illustrated at reference numeral 634, from personal user data storage system 630, a user controls distribution of data and may store attributes and custom avatars generated over a span of time.

In a further example of storage system 150, a group history system 640 may track and analyze the attribute history of a group of users, such as a family. By tracking and analyzing user attributes and differential attributes for a group of users, over time, group history system 640 may identify common differential attributes of the group or a range of common differential attributes and output the common differential attributes as a group signature or group set of differential attributes which can be applied to an avatar, as illustrated at reference numeral 642. In one example, diagnosis system 620 may receive the group set of differential attributes and identify common health problems or predict health problems for a group. In another example, avatar creator system 140 may apply the group set of differential attributes to a base avatar to create a custom avatar which is representative of a group of users. In addition, avatar creator system 140 may receive the group set of differential attributes with a range of common differential attributes and randomly select to apply a particular attribute from among the range of common differential attributes to create a custom avatar which is randomly representative of the group of users.

In addition, group history system 640 may analyze user attributes or differential attributes for a group, identify the attributes common to the group, and establish a group norm for the group, as illustrated at reference numeral 644. Group history system 640 may transmit the group norm to systems that compare user attributes against group norms, such as differential system 130 or diagnosis systems 620. For example, differential system 130 maintains group norms 408 for one or more groups, against which user attributes are compared. In addition, for example, diagnosis systems 620 may store group norms for a family and compare user attributes for a member of a family against group health norms.

Figure 7:
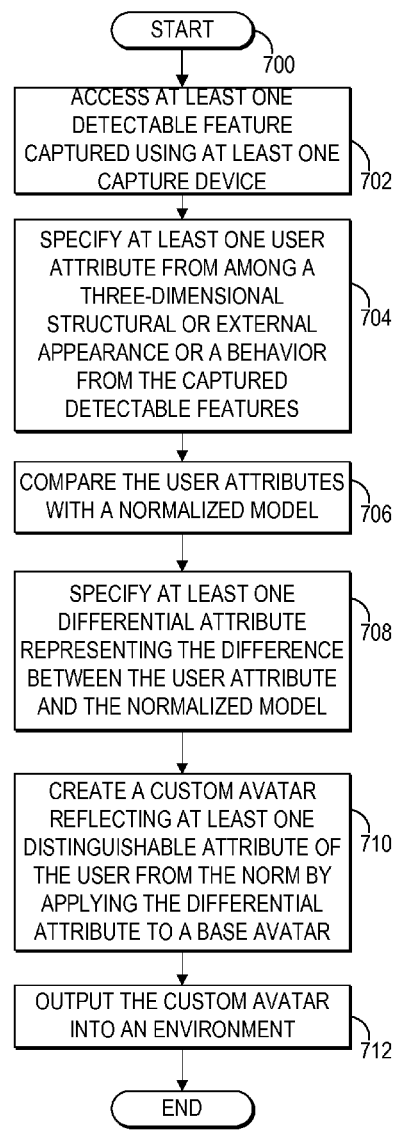
FIG. 7 is a high level logic flowchart depicting a process and program for creating a custom avatar which reflects the distinguishable attributes of a user.

With reference now to FIG. 7, a high level logic flowchart depicts a process and program for creating a custom avatar which reflects the distinguishable attributes of a user. As illustrated, the process starts at block 700 and thereafter proceeds to block 702. Block 702 depicts accessing at least one captured detectable feature of a user using at least capture device. Next, block 704 illustrates specifying the user attributes with at least one three-dimensional structural or external user attribute or a behavioral attribute from the captured detectable features. Thereafter, block 706 depicts comparing the user attributes with a normalized model. Block 708 illustrates specifying at least one differential attribute representing the difference between the user attribute and the normalized model. Next, block 710 depicts creating a custom avatar reflecting at least one distinguishable attribute of the user from the norm by applying the differential attribute to a base avatar. Thereafter, block 712 illustrating outputting the custom avatar into an environment, and the process ends.

Figure 8:
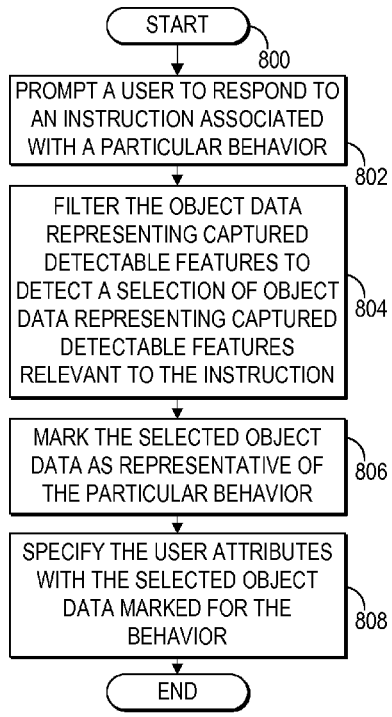
FIG. 8 is a high level logic flowchart illustrating a process and program for training the capture system to detect behavior attributes.

Referring now to FIG. 8, a high level logic flowchart illustrates a process and program for training the capture system to detect behavior attributes. In the example, the process starts at block 800 and thereafter passes to block 802. Block 802 illustrates prompting a user to respond to an instruction associated with a particular behavior. Next, block 804 depicts filtering the object data representing captured detectable features to detect the object data representing a selection of captured detectable features relevant to the instruction. Thereafter, block 806 illustrates marking the object data as representative of the particular behavior. Next, block 808 depicts specifying the user attributes with the selection of object data marked for the behavior, and the process ends.

Figure 9:
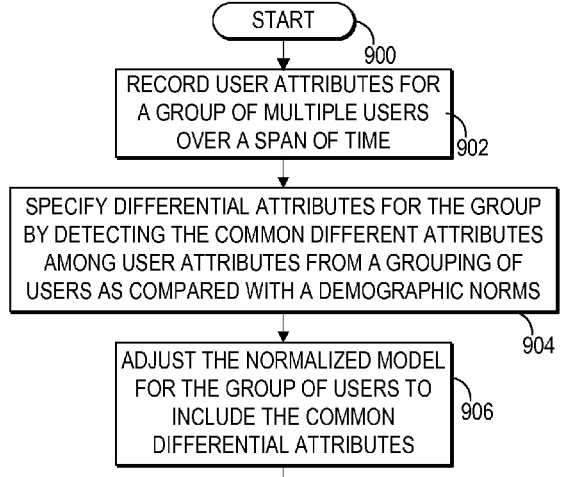
FIG. 9 is a high level logic flowchart depicting a process and program for monitoring and specifying differential attributes for a group of users, such as a family.

With reference now to FIG. 9, a high level logic flowchart depicts a process and program for monitoring and specifying differential attributes for a group of users, such as a family. In the example, the process starts at block 900 and thereafter proceeds to block 902. Block 902 illustrates recording user attributes for multiple group users over a span of time. Next, block 904 depicts specifying differential attributes for the group by detecting the common differential attributes among users attributes from the grouping of users as compared with demographic norms. In one example, a member of the group may send the group differential attributes to an avatar creator system to create a custom avatar for the user or the group based on the differential attributes for the group. Thereafter, block 906 illustrates adjusting the normalized model for the group of users to include the common differential attributes, and the process ends.

Figure 10:
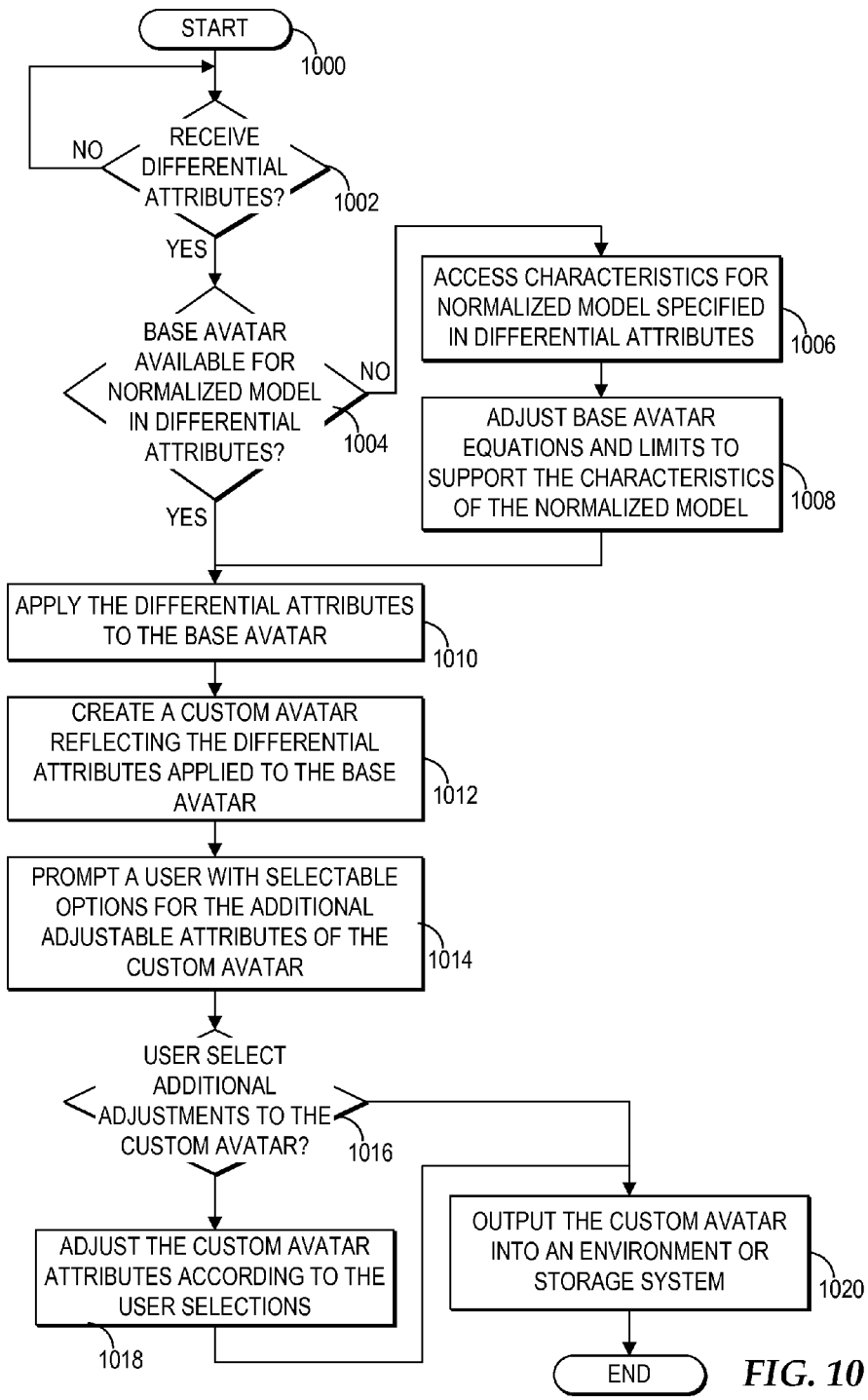
FIG. 10 is a high level logic flowchart illustrating a process and program for creating a custom avatar from differential attributes.

Referring now to FIG. 10, a high level logic flowchart illustrates a process and program for creating a custom avatar from differential attributes. In the example, the process starts at block 1000 and thereafter proceeds to block 1002. Block 1002 illustrates a determination whether the avatar creator system receives differential attributes. When the avatar creator system receives differential attributes, then the process passes to block 1004. Block 1004 depicts a determination whether a base avatar is available for the normalized model specified in the differential attributes. If a base avatar is already available, then the process passes to block 1010. If a base avatar is not already available, then the process passes to block 1006. Block 1006 illustrates accessing characteristics for the normalized model specified in the differential attributes. Next, block 1008 depicts adjusting the base avatar equations and limits to supports the characteristics of the normalized model, and the process passes to block 1010.

Block 1010 depicts applying the differential attributes to the base avatar. Next, block 1012 illustrates creating the custom avatar for distribution to a computing environment reflecting the differential attributes applied to the base avatar. Thereafter, block 1014 depicts prompting a user with selectable options for the additional adjustable attributes of the custom avatar. Next, block 1016 illustrates a determination whether a user selects additional adjustments to the custom avatar. If the user does not select adjustments to the custom avatar, then the process passes to block 1020. Block 1020 depicts outputting the custom avatar into an environment or storage system, and the process ends. Returning to block 1016, if the user selects additional adjustments to the custom avatar, the process passes to block 1018. Block 1018 illustrates adjusting the custom avatar attributes according to the user selections, and the process passes to block 1020.

While the invention has been particularly shown and described with reference to a preferred embodiment, it will be understood by those skilled in the art that various changes in form and detail may be made therein without departing from the spirit and scope of the invention.

What is claimed is:

1. A method for creating a computer-implemented avatar, comprising:

receiving, by an avatar creator system, at least one differential attribute from a differential system, wherein the differential attribute represents the difference between a plurality of detectable attributes captured of a user and a normalized model of attributes, wherein the normalized model of attributes characterize normal representative attribute values for a particular attribute as sampled across a plurality of users;

customizing an appearance of at least one avatar, by the avatar creator system, by adjusting at least one adjustable attribute of a base avatar definition by the at least one differential attribute, wherein the customized avatar reflects a selection of the plurality of detectable attributes of the user which are distinguishable from the normalized model of attributes as applied to the base avatar definition; and graphically distinguishing the customized portions of the appearance of the at least one avatar as applied to the base avatar definition by displaying an additional graphical attribute applied only to the customized portions of the at least one avatar reflecting the at least one differential attribute.

2. The method according to claim 1, further comprising:
capturing, at a first depth, a surface mapping of the detectable external surface of the user;
capturing, at a second depth, a surface mapping of the user through clothing worn by the user;
capturing, at a third depth, a mapping of points representing at least one of muscle movement and bone movement; and
combining the surface mapping at the first depth, the surface mapping at the second depth and the mapping at the third depth into a three dimensional representation of the user with multiple depths.

3. The method according to claim 1, further comprising:
capturing a plurality of video images of the user each at a different angle;
identifying a plurality of objects within the plurality of video images which each track one of a selection of parts of a user;
combining each selection of a plurality of objects tracking a same part into a three-dimensional representation of the same part; and
specifying the plurality of detectable attributes of the user by each combined three-dimensional representation of the same part.

4. The method according to claim 1, further comprising:
prompting the user to respond to a particular instruction for a particular script from among a plurality of scripts, wherein a particular behavioral attribute is associated with the particular instruction;
capturing at least one of speech of the user and body movement of the user associated with the particular instruction; and
specifying the plurality of detectable attributes of the user by marking the at least one of speech and body movement as the particular behavioral attribute.

5. The method according to claim 1, further comprising:
capturing a plurality of sets of user detectable attributes for a group of users over a period of time;
detecting at least one common attribute among the plurality of sets of user detectable attributes different from the normalized model; and
creating the normalized model of attributes for the plurality of users based on the at least one common attribute.

6. The method according to claim 1, wherein graphically distinguishing the customized portions of the appearance of the at least one avatar as applied to the base avatar definition by displaying an additional graphical attribute applied only to the customized portions of the at least one avatar reflecting the at least one differential attribute further comprises:
graphically distinguishing the customized portions of the appearance of the at least one avatar as applied to the base avatar definition by displaying an additional graphical attribute comprising a particular color applied only to the customized portions of the at least one avatar reflecting the at least one differential attribute.

7. The method according to claim 1, wherein customizing an appearance of at least one avatar, by the avatar creator system, by adjusting at least one adjustable attribute of a base avatar definition by the at least one differential attribute, wherein the customized avatar reflects a selection of the plurality of detectable attributes of the user which are distinguishable from the normalized model of attributes as applied to the base avatar definition, further comprises customizing the at least one avatar for interacting within an environment responsive to a plurality of scripts customized by a plurality of behavioral attributes from at least one selection of differential attributes for a user applied during at least one point in time.

8. The method according to claim 1, further comprising:
comparing, by the differential system, said plurality of detectable attributes with the normalized model of attributes, wherein the normalized model of attributes represent a range of normal representative attribute values for the particular attribute;
outputting, by the differential system the at least one differential attribute representing the difference between the plurality of detectable attributes which are outside the range of normal representative attribute values for the particular attribute.

9. The method according to claim 1, further comprising:
storing the plurality of detectable attributes of the user with a timestamp for a time captured;
accessing the plurality of detectable attributes by the avatar creator system at another time;
setting the base level of the at least one adjustable attribute for the at least one avatar by the plurality of detectable attributes from the accessed plurality of detectable attributes.

10. A system for creating a computer-implemented avatar, comprising:
an avatar creator system operative on one or more processors and one or more memories;
the avatar creator system operative to receive at least one differential attribute from a differential system, wherein the differential attribute represents the difference between a plurality of detectable attributes captured of a user and a normalized model of attributes, wherein the normalized model of attributes characterize normal representative attribute values for a particular attribute as sampled across a plurality of users;
the avatar creator system operative to customize an appearance of at least one avatar by adjusting at least one adjustable attribute of a base avatar definition by the at least one differential attribute, wherein the customized avatar reflects a selection of the plurality of detectable attributes of the user which are distinguishable from the normalized model of attributes as applied to the base avatar definition; and
the avatar creator system operative to graphically distinguish the customized portions of the appearance of the at least one avatar as applied to the base avatar definition by displaying an additional graphical attribute applied only to the customized portions of the at least one avatar reflecting the at least one differential attribute.

11. The system according to claim 10, further comprising:
a capture system operative to capture, at a first depth, a surface mapping of the detectable external surface of the user;
the capture system operative to capture, at a second depth, a surface mapping of the user through clothing worn by the user;
the capture system operative to capture, at a third depth, a mapping of points representing at least one of muscle movement and bone movement; and
the capture system operative to combine the surface mapping at the first depth, the surface mapping at the second depth and the mapping at the third depth into a three dimensional representation of the user with multiple depths.

12. The system according to claim 10, further comprising:
a capture system operative to capture a plurality of video images of the user each at a different angle;

the capture system operative to identify a plurality of objects within the plurality of video images which each track one of a selection of parts of a user;

the capture system operative to combine each selection of a plurality of objects tracking a same part into a three-dimensional representation of the same part; and the capture system operative to specify the plurality of detectable attributes of the user by each combined three-dimensional representation of the same part.

13. The system according to claim 10, further comprising:

a capture system for capturing a plurality of sets of user detectable attributes for a group of users over a period of time;

the differential system for detecting at least one common attribute among the plurality of sets of user detectable attributes different from the normalized model;

the differential system for creating the normalized model of attributes of the plurality of users based on the at least one common attribute.

14. The system according to claim 10, further comprising:

the differential system for concurrently outputting the at least one differential attribute concurrently via a network to a plurality of avatar creator systems;

each of a plurality of avatar creator systems for applying a separate equation specifying a separate base level of a separate at least one adjustable attribute to customize a different base avatar at each of the plurality of avatar creator systems.

15. A program product comprising a non-transitory computer-readable storage device including a computer-readable program for creating a computer-implemented avatar, wherein the computer-readable program when executed on a computer causes the computer to:

receive at least one differential attribute from a differential system, wherein the differential attribute represents the difference between a plurality of detectable attributes captured of a user and a normalized model of attributes, wherein the normalized model of attributes characterize normal representative attribute values for a particular attribute as sampled across a plurality of users;

customize an appearance of at least one avatar by adjusting at least one adjustable attribute of a base avatar definition by the at least one differential attribute, wherein the customized avatar reflects a selection of the plurality of detectable attributes of the user which are distinguishable from the normalized model of attributes as applied to the base avatar definition;

graphically distinguish the customized portions of the appearance of the at least one avatar as applied to the base avatar definition by displaying an additional graphical attribute applied only to the customized portions of the at least one avatar reflecting the at least one differential attribute.

* * * * *